(12) United States Patent
Salter et al.

(10) Patent No.: US 11,565,645 B2
(45) Date of Patent: Jan. 31, 2023

(54) PIVOTABLE SILL FOR A VEHICLE

(71) Applicant: Ford Global Technologies, LLC, Dearborn, MI (US)

(72) Inventors: Stuart C. Salter, White Lake, MI (US); David Brian Glickman, Southfield, MI (US); Martin Delonis, Northville, MI (US); Michael Harmon, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 101 days.

(21) Appl. No.: 17/184,025

(22) Filed: Feb. 24, 2021

(65) Prior Publication Data

US 2022/0266915 A1 Aug. 25, 2022

(51) Int. Cl.
*B60R 21/02* (2006.01)
*B60P 3/34* (2006.01)
*B60J 5/10* (2006.01)
*B62D 25/02* (2006.01)

(52) U.S. Cl.
CPC ............. *B60R 21/026* (2013.01); *B60J 5/108* (2013.01); *B60P 3/341* (2013.01); *B62D 25/025* (2013.01)

(58) Field of Classification Search
CPC ......... B60J 5/108; B60P 3/341; B60R 21/026; B62D 33/037
USPC ............................ 296/209, 190.11, 55, 146.8
See application file for complete search history.

(56) References Cited

U.S. PATENT DOCUMENTS

| | | | | |
|---|---|---|---|---|
| 4,480,868 A * | 11/1984 | Koto | .................... | B60N 2/3095 297/335 |
| 5,820,189 A * | 10/1998 | Tew | ........................ | B60P 3/341 296/26.11 |
| 6,478,355 B1 * | 11/2002 | Van Eden | ............ | B62D 47/003 296/37.6 |
| 6,786,535 B1 * | 9/2004 | Grzegorzewski | .... | B60N 2/3013 296/37.16 |
| 6,837,529 B2 * | 1/2005 | Kharod | ................... | B60J 1/1853 296/183.1 |
| 7,766,416 B2 * | 8/2010 | McClure | ................ | B62D 33/00 296/183.1 |
| 7,866,926 B2 * | 1/2011 | Lim | ......................... | B60R 7/02 410/121 |
| 2003/0011212 A1 * | 1/2003 | Hashimoto | .......... | B62D 47/003 296/190.11 |
| 2009/0039675 A1 * | 2/2009 | King | ........................ | B60P 3/423 296/182.1 |
| 2013/0175818 A1 * | 7/2013 | Bates | ................... | B62D 47/003 296/10 |
| 2016/0185397 A1 * | 6/2016 | Huston | ................. | E05B 63/248 292/210 |

FOREIGN PATENT DOCUMENTS

JP 3570257 7/2004

* cited by examiner

*Primary Examiner* — Jason S Morrow
*Assistant Examiner* — Wenwei Zhuo
(74) *Attorney, Agent, or Firm* — Vichit Chea; Carlson, Gaskey & Olds, P.C.

(57) ABSTRACT

A vehicle assembly includes, among other things, a cab back panel assembly pivotably coupled to a cab of a vehicle, and a sill assembly that includes a portion of a securing system. The sill assembly is pivotably coupled to the vehicle. The sill assembly is pivotable back and forth between a latching position where the cab back panel assembly can engage the portion of the sill assembly and a stowed position.

16 Claims, 4 Drawing Sheets

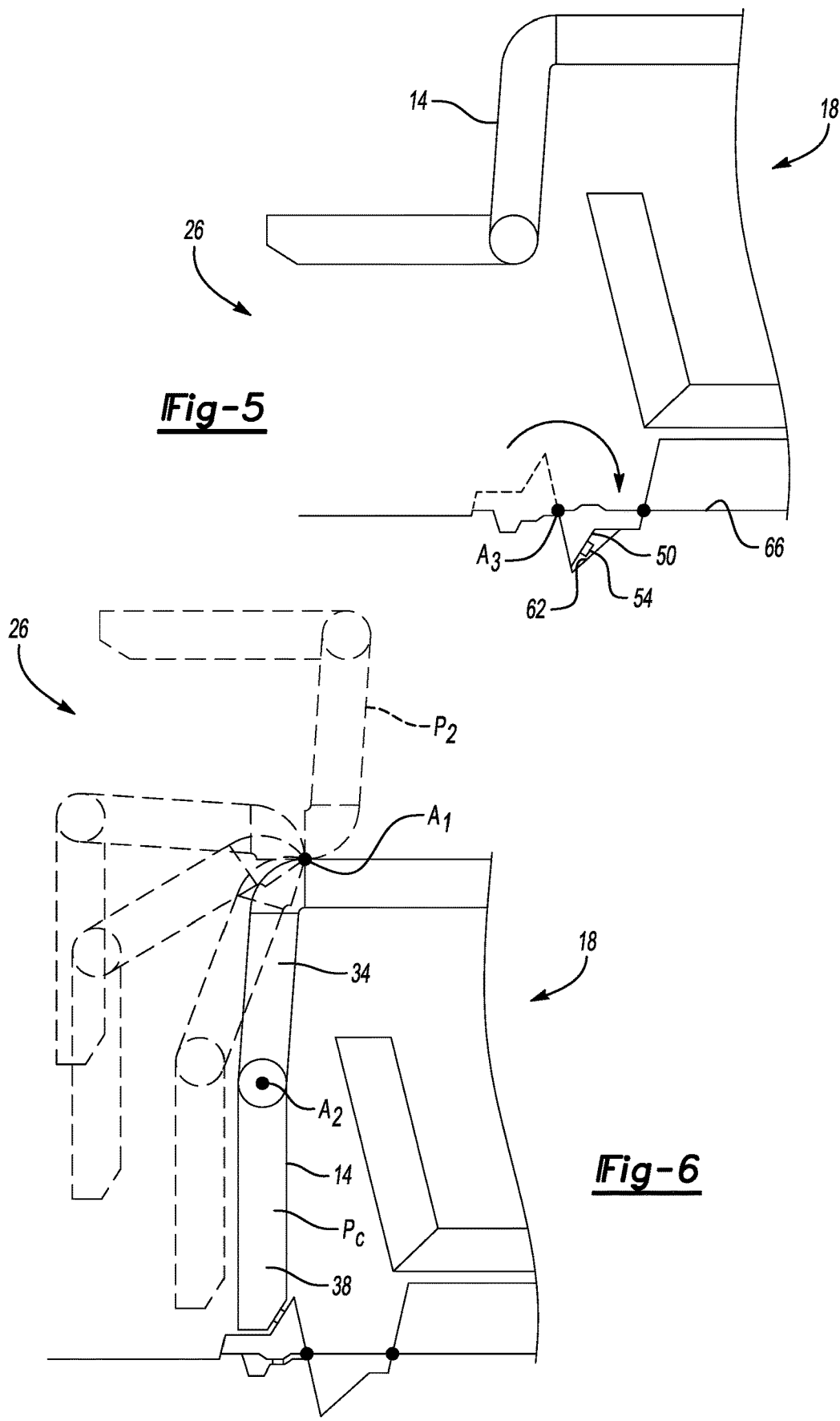

PIVOTABLE SILL FOR A VEHICLE

TECHNICAL FIELD

This disclosure relates generally to pivotable sill for a vehicle and, more particularly, to a pivotable sill assembly that can secure to a cab back panel assembly.

BACKGROUND

A typical pickup truck has a cab providing a passenger compartment and a cargo bed providing a cargo area. A cab back is positioned between the passenger compartment and the cargo bed. A front wall of the cargo bed is spaced a distance from the cab back. In some pickup trucks, such as unibody pickup trucks, the cab back can provide the front wall of the cargo bed.

SUMMARY

A vehicle assembly according to an exemplary aspect of the present disclosure includes, among other things, a cab back panel assembly pivotably coupled to a cab of a vehicle, and a sill assembly that includes a portion of a securing system. The sill assembly is pivotably coupled to the vehicle. The sill assembly is pivotable back and forth between a latching position where the cab back panel assembly can engage the portion of the sill assembly and a stowed position.

In a further embodiment of the foregoing assembly, the vehicle is a unibody vehicle having a unibody configuration.

In a further embodiment of any of the foregoing assemblies, the cab back panel assembly separates a passenger compartment of the vehicle from a cargo area of the vehicle when the cab back panel assembly is in a closed position. The passenger compartment opens to the cargo area when the cab back panel assembly is in an open position.

In a further embodiment of any of the foregoing assemblies, the vehicle is an electrified vehicle.

In a further embodiment of any of the foregoing assemblies, the cab back panel assembly has a first panel and a second panel. The first panel is vertically above the second panel when the cab back panel assembly is in a closed position. The first panel is pivotably coupled to a cab of a vehicle. The second panel is pivotably coupled to the first panel and configured to engage the portion of the securing system when the sill assembly is in the latching position and the cab back panel assembly is in the closed position.

In a further embodiment of any of the foregoing assemblies, the first panel is configured to pivot relative to the cab about a first axis without pivoting the second panel relative to first panel about a second axis.

In a further embodiment of any of the foregoing assemblies, the second panel is configured to pivot about the second axis more than 90 degrees relative to the first panel.

A further embodiment of any of the foregoing assemblies includes at least one extendable support configured to move back and forth between a retracted position and an extended position. The extendable support is at least partially retracted within the second panel when in the retracted position.

In a further embodiment of any of the foregoing assemblies, the extendable support is configured to extend from the second panel to cover a cargo area within a cargo bed of the vehicle.

In a further embodiment of any of the foregoing assemblies, the at least one flip-up support is configured to span between a tailgate of the vehicle and the second panel of the cab back panel assembly.

In a further embodiment of any of the foregoing assemblies, the sill assembly is vertically higher when the sill assembly is in the latching position than when the sill assembly is in the stowed position.

In a further embodiment of any of the foregoing assemblies, the vehicle is a pickup truck having a cargo bed with a floor. The sill assembly is vertically beneath the floor of the cargo bed when the sill assembly is in the stowed position.

A further embodiment of any of the foregoing assemblies includes a tent configured to be supported by the cab back panel assembly in the open position.

A further embodiment of any of the foregoing assemblies includes pockets of the tent. The pockets are configured to receive side mirrors of the vehicle when the tent is supported by the cab back panel assembly.

A method of securing a cab back panel assembly according to another exemplary aspect of the present disclosure includes, among other things, latching a cab back panel assembly of a vehicle to a portion of a securing system. A sill assembly includes the portion. The cab back panel assembly and the sill assembly are each pivotably coupled to the vehicle.

A further embodiment of the foregoing method includes, prior to the latching, pivoting the sill assembly from a stowed position to a latching position where the cab back panel assembly can engage the portion of the sill assembly.

In a further embodiment of any of the foregoing methods, the cab back panel assembly separates a passenger compartment of the vehicle from a cargo area of the vehicle when the cab back panel assembly is in a closed position and latched to the portion of the sill assembly. The passenger compartment opens to the cargo area when the cab back panel assembly is in an open position.

In a further embodiment of any of the foregoing methods, the cab back panel assembly includes a first panel and a second panel. The first panel is pivotably coupled to a cab of the vehicle and is configured to pivot relative to the cab about a first axis. The second panel is pivotably coupled to the first panel and is configured to pivot relative to the first panel about a second axis that is spaced from the first axis.

In a further embodiment of any of the foregoing assemblies, the first panel is vertically above the second panel when the cab back panel assembly is in a closed position.

In a further embodiment of any of the foregoing assemblies, the second panel is pivotably coupled to a lower region of the first panel.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 5 illustrates a section view taken at line 5-5 in FIG. 4.

FIG. 6 illustrates a side view of the cab back panel assembly of FIG. 2 in a closed position and various open positions.

DETAILED DESCRIPTION

This disclosure relates generally to a cab back panel assembly for a vehicle. The vehicle can be a unibody pickup truck. The vehicle can be an electrified vehicle having a traction battery that provides power to one or more motors used to drive wheels of the vehicle.

The cab back panel assembly can be moved between a closed position and one, of several, open positions. Moving the cab back panel assembly to one of the open positions opens a passenger compartment of the vehicle to a cargo area within a cargo bed of the vehicle.

Figure 1:
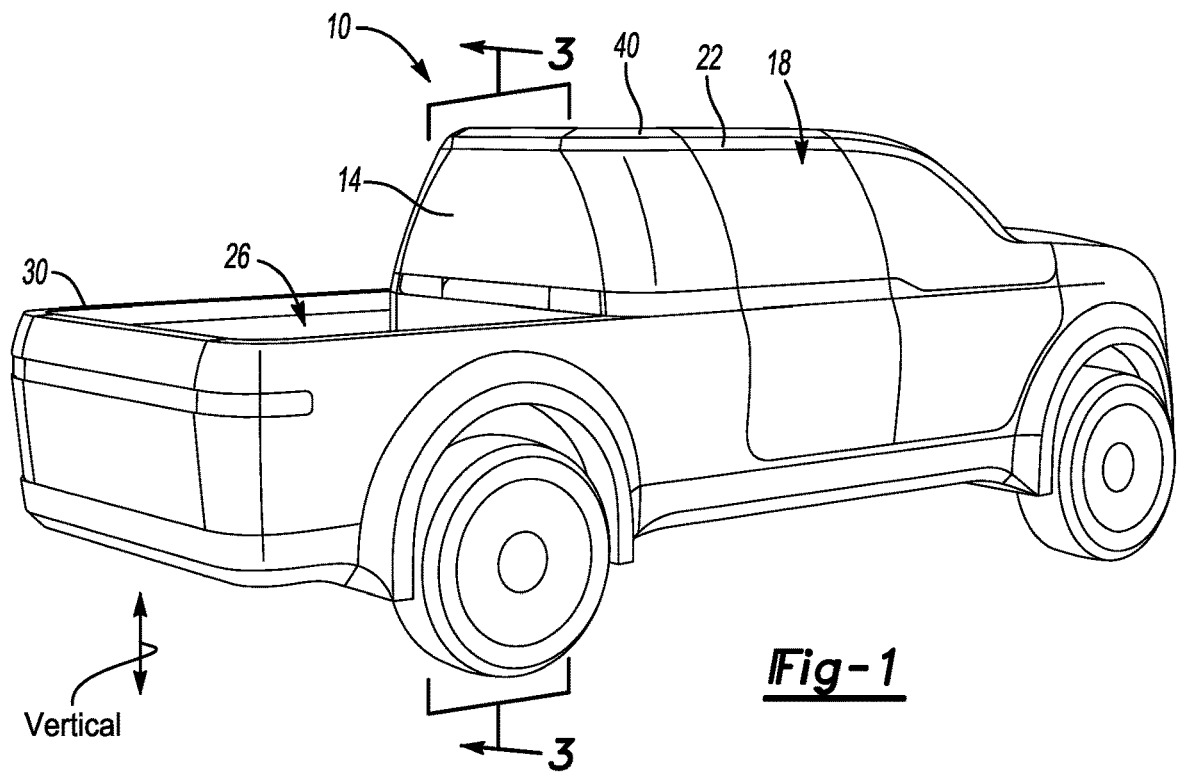
FIG. 1 illustrates a vehicle including a cab back panel assembly in a closed position according to an exemplary aspect of the present disclosure.
Figure 2:
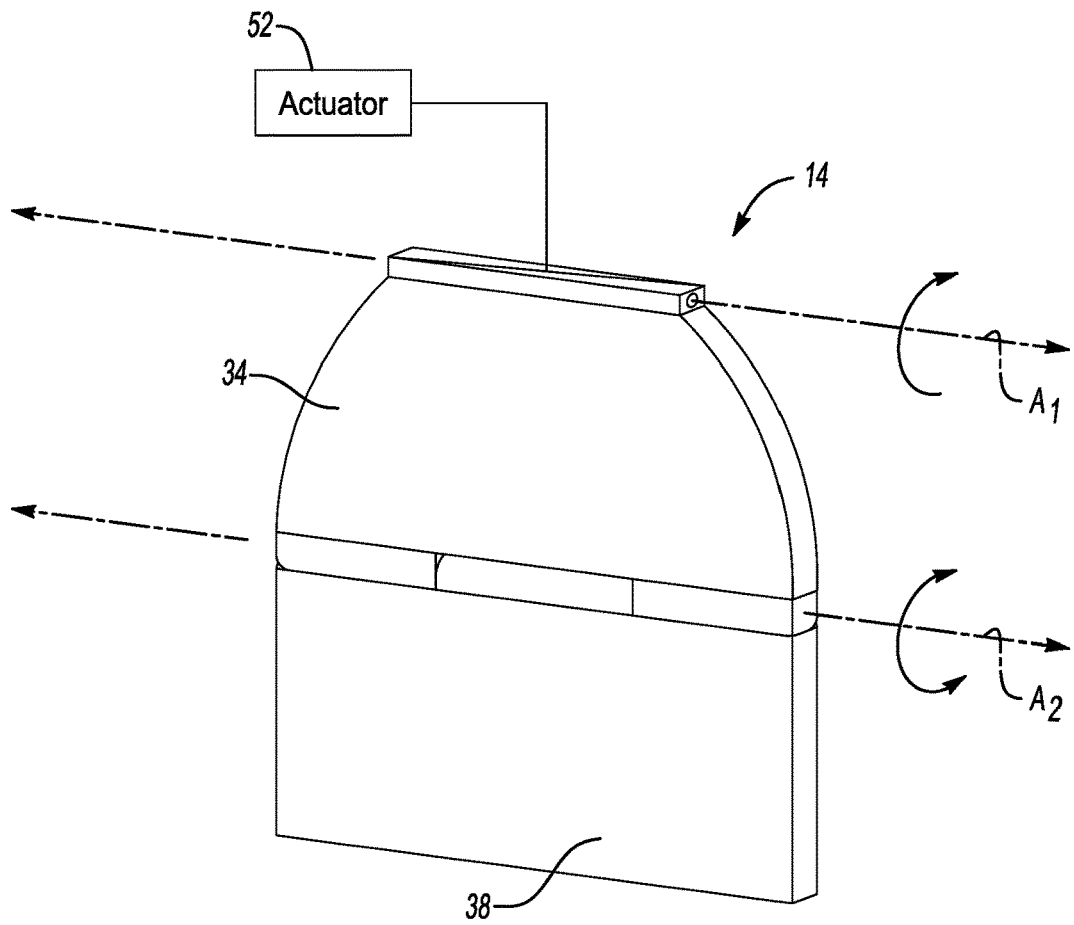
FIG. 2 illustrates a perspective view of the cab back panel assembly of FIG. 1.
Figure 3:
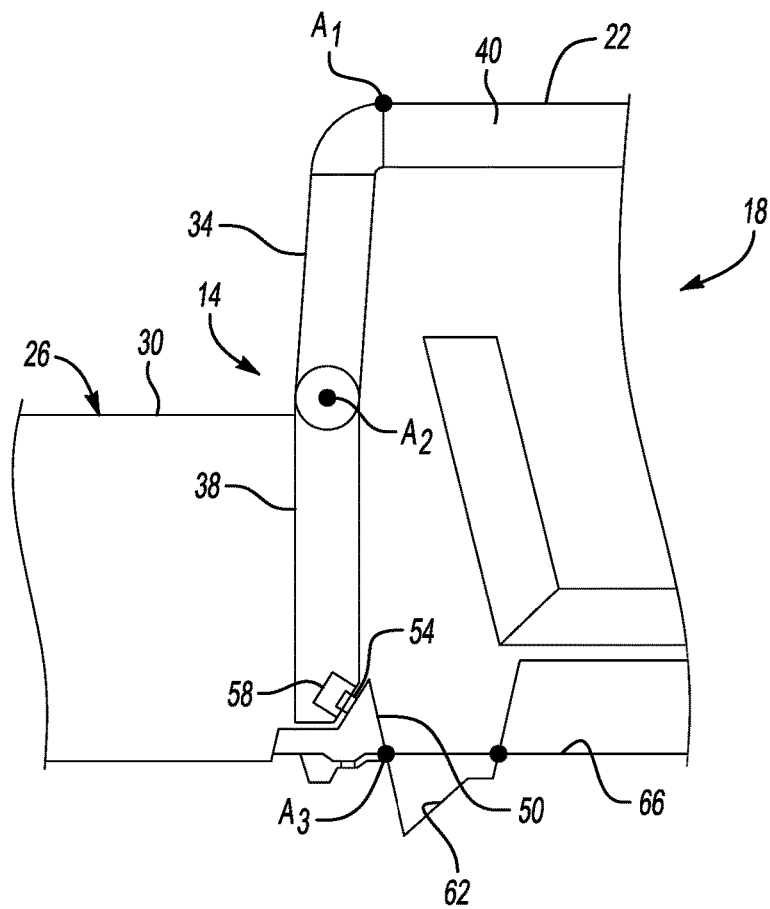
FIG. 3 illustrates a section view taken at line 3-3 in FIG. 1.

With reference to FIGS. 1-3, a vehicle 10 includes a cab back panel assembly 14, a passenger compartment 18 within a cab 22, and a cargo area 26 within a cargo bed 30.

The cab back panel assembly 14 as shown in a closed position in FIG. 1. When the cab back panel assembly 14 is in the closed position, the cab back panel assembly 14 closes off the passenger compartment 18 from the cargo area 26.

The exemplary vehicle 10 is a unibody pickup truck. As the vehicle 10 has a unibody configuration, the cab 22 and the cargo bed 30 are not supported on a vehicle frame separate from the cab 22 and the cargo bed 30. In the vehicle 10, when the cab back panel assembly 14 is in the closed position, the cab back panel assembly 14 provides both the back wall of the cab 22 and a front wall of the cargo bed 30.

A conventional body-on-frame vehicle is different than a vehicle having a unibody configuration. In a conventional body on a frame vehicle, a back wall of the cab is spaced a distance from a front wall of a cargo bed such that there is an open gap between the cab and the cargo bed. The back wall of the cab is different than the front wall of the cargo bed in a conventional body-on-frame vehicle.

In the exemplary embodiment, the cab back panel assembly 14 includes a first panel 34 and a second panel 38. The first panel 34 is an upper panel, and the second panel 38 is a lower panel. When in the closed position, the first panel 34 is vertically above the second panel 38. Vertical, for purposes of this disclosure, is with reference to ground and the general orientation of the vehicle 10 during operation.

An upper region of the first panel 34 is pivotably connected to the cab 22 of the vehicle 10. The pivotable connection permits the first panel 34 to pivot relative to the cab 22 about a first axis $A_1$. A top side 40 of the cab 22 is vertically aligned with the first axis $A_1$ in this example. A person having skill in this art and the benefit of this disclosure could understand how to pivotably couple a panel to a cab of a vehicle.

An upper region of the second panel 38 is pivotably coupled to a lower region of the first panel 34. The pivotable connection between the second panel 38 and the first panel 34 permits pivoting of the second panel 38 relative to the first panel about a second pivot axis $A_2$.

The vehicle 10 includes a sill assembly 50 having a striker 54 of a securing system. The sill assembly 50 is pivotable from the latching position shown in FIG. 3 to a stowed position as shown in FIG. 5. When the sill assembly 50 is in latching position of FIG. 3, the striker 54 of the sill assembly 50 can engage a latch 58 of the securing system. The latch 58 is held within the second panel 38 of the cab back panel assembly 14. When the striker 54 of the sill assembly 50 engages the latch 58 of the second panel 38, the securing system is latched and holds the cab back panel assembly 14 in the closed. Although the exemplary embodiment shows the striker 54 as part of the sill assembly 50 and the latch 58 as part of the second panel 38, these components could be reversed such that the sill assembly 50 includes the latch 58 and the striker is part of the second panel 38. Further, types of securing systems that do not include a latch and striker could be utilized in place of the latch 58 and the striker 54.

When the cab back panel assembly 14 is moved to an open position, such as the first open position shown in FIG. 5, the sill assembly 50 can be pivoted about an axis $A_3$ from the latching position of FIG. 3 to the stowed position of FIG. 5. In the exemplary embodiment, when the sill assembly 50 is in the stowed position, the sill assembly 50 is received within a recess 62 of a floor 66 of the vehicle 10.

The sill assembly 50 is vertically higher than when in the latching position than when the sill assembly 50 is in the stowed position. In the exemplary embodiment, the sill assembly 50 is vertically beneath the floor 66 when the sill assembly 50 is in the stowed position of FIG. 5. Pivoting the sill assembly 50 such that the sill assembly 50 is in the stowed position within the recess 62 provides a relatively flat load floor extending from the cargo area 26 into the passenger compartment 18. This can facilitate storing cargo. For example, lumber or sheets of drywall may be able to slide from the cargo area 26 into the passenger compartment 18 across the floor 66 without the sliding interrupted by a raised sill assembly.

Figure 4:
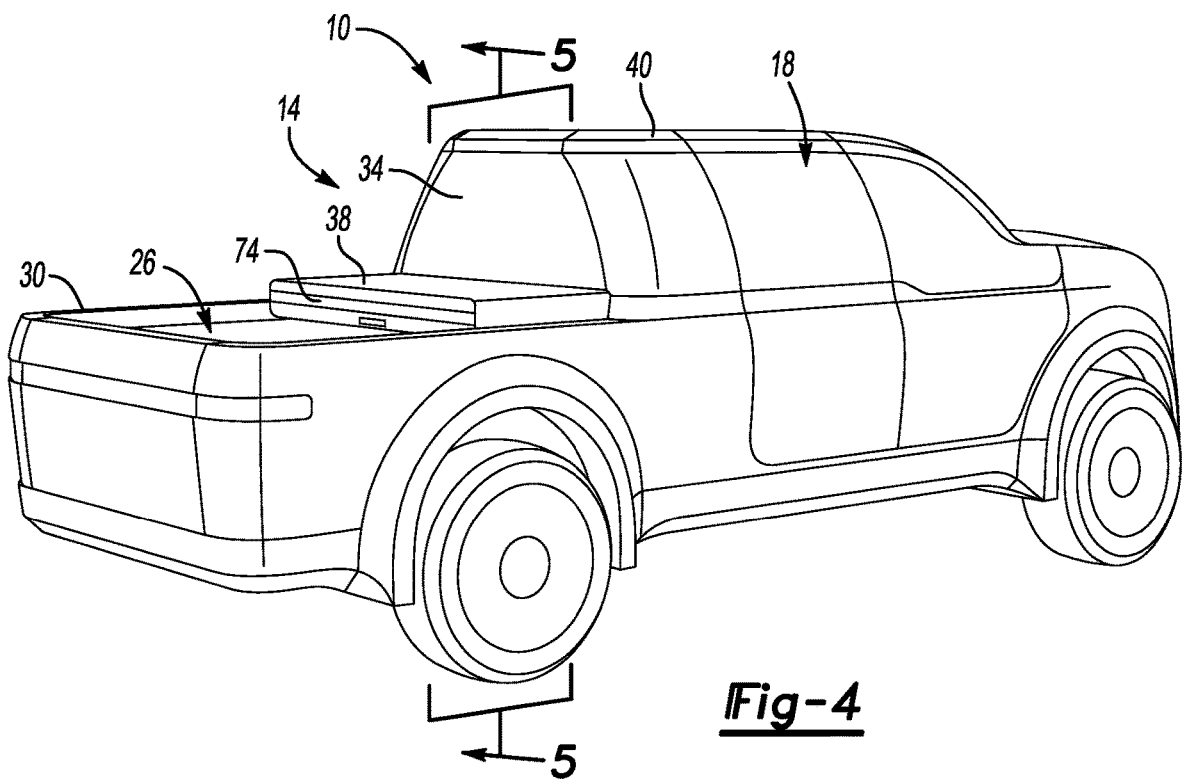
FIG. 4 illustrates the vehicle of FIG. 1 after the cab back panel assembly has been moved from the closed position of FIG. 1 into a first open position.

The pivotable connection between the second panel 38 and the first panel 34 permits the second panel 38 to pivot about the axis $A_2$ from the closed position shown in FIGS. 1-3 to the open position in FIGS. 4 and 5. In the exemplary embodiment, an actuator 52 of the vehicle 10 drives the pivoting of the second panel 38 from the closed position of FIGS. 1-3 to the first open position. In another example, a user could manually pivot the second panel 38 about the axis $A_2$ to move the cab back panel assembly 14 from the closed position of FIGS. 1-3 to the first open position of FIGS. 4-5.

FIG. 6 generally shows selected positions of the cab back panel assembly 14 when moving from the closed position $P_C$ to a second open position $P_2$ according to an exemplary embodiment of the present disclosure. The second open position $P_2$ is a fully open position in this example.

Notably, when moving from the closed position $P_C$ to the second open position $P_2$, the first panel 34 is rotated in a clockwise direction about the axis $A_1$ as the second panel 38 rotates in a counter-clockwise direction about the axis $A_2$ relative to the first panel 34. This can help to reduce the amount of clearance required to move the cab back panel assembly 14 back and forth between the closed position $P_C$ and the second open position $P_2$. Accordingly, cargo within the cargo area 26, or a goose neck trailer attachment, will be less likely to interfere with movement of the cab back panel assembly 14. The movement path shown in FIG. 6 also helps to manage water or snow accumulation.

A portion of the actuator 52 that rotates the second panel 38 relative to the first panel 34 keeps the second panel 38 substantially parallel to the cab 22 by relating a position of the actuator 52 driving rotation of the first panel 34 and/or power strut position. This may be accomplished using, for example, a Hall Effect counter or visual/electrical signal or resistance.

The cab back panel assembly 14 can, in some examples, include sensors that are used to identify potentially obstructions that could interfere with movement of the cab back panel assembly 14. The sensors could be radar sensors, for example.

As demonstrated by a comparison of the second panel 38 relative to the first panel 34 in FIG. 4 and the positions of the second panel 38 relative to the first panel 34 in FIG. 6, the second panel 38 can pivot about the axis $A_2$ relative to the first panel 34 more than 90 degrees and up to, in this example, 180 degrees.

The pivoting movement can be provided by a structural beam. Pivot locks can be used to hold the second panel 38 in particular positions relative to the first panel 34. The pivot lock can include pins received within openings. For example, the pins could extend into respective openings to lock the second panel 38 in the first open position of FIG. 4, the closed position of FIG. 3, or the second open position of FIG. 6. The pins could be retracted by the actuator 52 when pivoting of the second panel 38 about the axis $A_2$ is required. Alternatively, the pivot locks could be locks provided by a pivot motor of the actuator 52.

Figure 7:
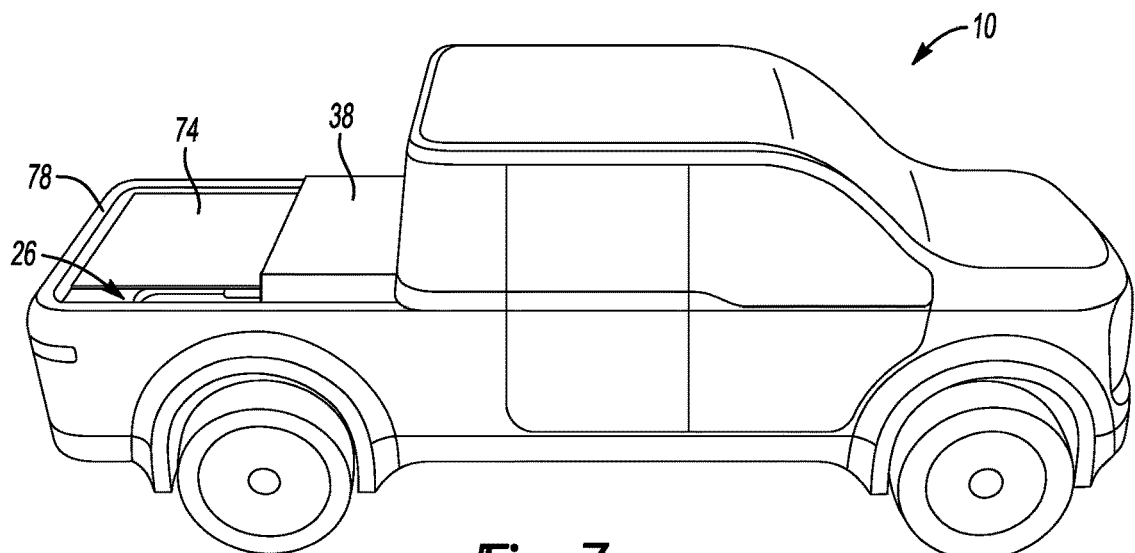
FIG. 7 illustrates another perspective view of the vehicle of FIG. 4 with the cab back panel assembly in the first open position and an extendable support in an extended position.

With reference to FIGS. 4 and 7, the cab back panel assembly 14, here the second panel 38, is configured to house an extendable support 74. In FIG. 7, the extendable support 74 is shown in an extended position where the extendable support 74 spans from the second panel 38 rearward to a tailgate 78 of the vehicle 10. The extendable support 74 in the extended position of FIG. 7 can help to conceal cargo within the cargo area 26 and can, in some examples, provide some aerodynamic benefit when driving. When the extendable support 74 is not required, the extendable support can be moved to a retracted position, as shown in FIG. 4, for storage. In another example, the extendable support could be hinged to the tailgate of the cargo bed 30 and can pivot upward to interface with the second panel 38 when required.

Other extendable supports could extend laterally from the second panel 38 and rest on walls of the cargo bed 30 to help support the second panel 38. The actuator 52 could be housed in the second panel 38 and drive a bell-crank mechanism to slide out these other extendable supports.

Figure 8:
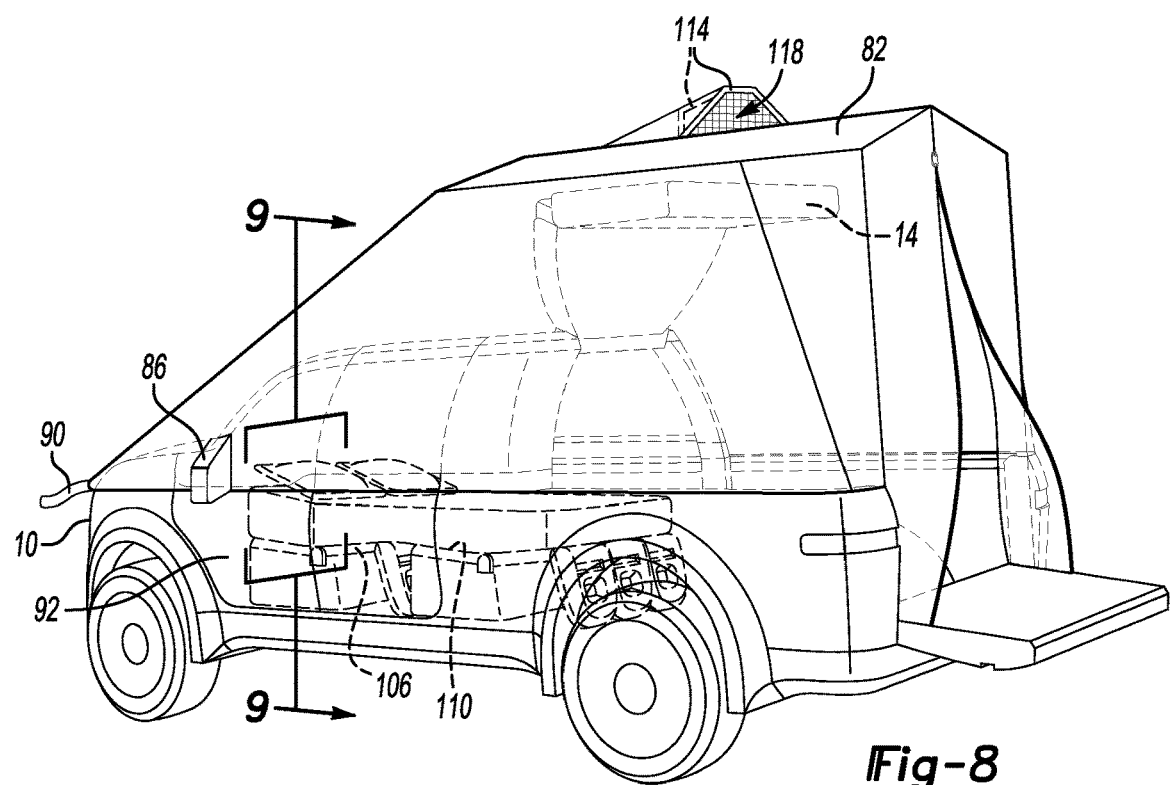
FIG. 8 illustrates the vehicle of FIG. 1 when the cab back panel assembly is in a second open position, and when the cab back panel assembly is utilized to at least partially support a canopy.

With reference to FIG. 8, the cab back panel assembly 14 can be used to support a tent 82. In this example, the cab back panel assembly 14 is in the second open position when the tent 82 is pitched.

The tent 82 includes side mirror pockets 86 that receive side mirrors of the vehicle 10 when the tent 82 is pitched as shown in FIG. 8. Receiving the side mirrors of the vehicle 10 within the pockets 86 can help to stabilize the tent 82.

In some examples, the tent 82 can be equipped with straps 90 that can secure to tie downs of the vehicle 10 to help further stabilize the tent 82. The tent 82 can instead or additionally be supported by posts extending within various pockets of the tent 82.

Figure 9:
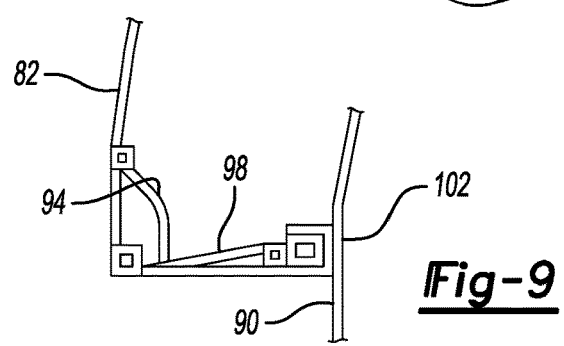
FIG. 9 illustrates a section view take at line 9-9 in FIG. 9.

As shown in the section view of FIG. 9, the tent 82 can project outward from a side 92 of the vehicle 10. The tent 82 can include a flap 94 that can be moved to selectively cover a vent screen 98. An individual within an interior of the tent 82 can vent the interior through the vent screen 98 by opening the flap 94.

The tent 82 can includes a protective material 102, such as a microfiber, in areas where the tent 82 interfaces with the sides of the vehicle 10. The protective material 102 can help to protect the vehicle 10 from damage by the tent 82. The protective material 102 can also facilitate sealing an interface between the edge of the tent 82 and the side 92. This can help to discourage insects from entering an interior of the tent 82, as well as dust and other particulate matter.

A user of the vehicle may rely on the tent 82 for shelter when camping or glamping, for example. In some examples, the vehicle 10 is equipped with seats 106 that can fold flat as shown in FIG. 8. When folded flat, the seats 106 can provide a sleeping surface 110 for the user. Heaters within the seats 106 can be utilized to selectively heat the sleeping surface 110. The seats 106 could additionally or instead be equipped with cooling devices, such a cooling bladders. A user of the tent 82 may turn on these cooling bladders for cooling when the user is on the sleeping surface 110. The bladders could also adjust to change how much cushioning the seats 106 provide. Map lights in the vehicle could become bedtime reading lamps when the user is using the seats 106 in this way.

The top of the tent 82 includes a twin hoop structure 114 establishing an opening 118. A mesh screen can cover the opening 118 to prevent insects from entering the tent 82. The opening 118 can help to ventilate an interior of the tent 82. The twin hoop structure 114 facilitates providing the opening in an area that the venting without providing a path for rain to pass into an interior of the tent 82.

In some examples, a sensor system could be used to monitor areas around the tent 82. For example, an ultrasonic sensor can monitor a defined area that extends six inches inward from the tent 82. Six inches can accommodate for the tent 82 flapping in the wind. If the ultrasonic sensor detects a person in this area, an alert can be issued. This allows the tent 82 and vehicle 10 to be protected while the user is away.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle assembly, comprising:
   a cab back panel assembly pivotably coupled to a cab of a vehicle; and
   a sill assembly that includes a portion of a securing system, the sill assembly pivotably coupled to the vehicle, the sill assembly pivotable back and forth between a latching position where the cab back panel assembly can engage the portion of the sill assembly and a stowed position,
   wherein the cab back panel assembly has a first panel and a second panel, the first panel vertically above the second panel when the cab back panel assembly is in a closed position, the first panel pivotably coupled to a cab of a vehicle, the second panel pivotably coupled to the first panel and configured to engage the portion of the securing system when the sill assembly is in the latching position and the cab back panel assembly is in the closed position.

2. The vehicle assembly of claim 1, wherein the vehicle is a unibody vehicle having a unibody configuration.

3. The vehicle assembly of claim 1, wherein the cab back panel assembly separates a passenger compartment of the vehicle from a cargo area of the vehicle when the cab back panel assembly is in a closed position, wherein the passenger compartment opens to the cargo area when the cab back panel assembly is in an open position.

4. The vehicle assembly of claim 1, wherein the vehicle is an electrified vehicle.

5. The vehicle assembly of claim 1, wherein the first panel is configured to pivot relative to the cab about a first axis without pivoting the second panel relative to first panel about a second axis.

6. The vehicle assembly of claim 5, wherein the second panel is configured to pivot about the second axis more than 90 degrees relative to the first panel.

7. The vehicle assembly of claim 1, further comprising at least one extendable support configured to move back and forth between a retracted position and an extended position, the at least one extendable support at least partially retracted within the second panel when in the retracted position.

8. The vehicle assembly of claim 7, wherein the at least one extendable support is configured to extend from the second panel to cover a cargo area within a cargo bed of the vehicle.

9. The vehicle assembly of claim 1, wherein the sill assembly is vertically higher when the sill assembly is in the latching position than when the sill assembly is in the stowed position.

10. The vehicle assembly of claim 9, wherein the vehicle is a pickup truck having a cargo bed with a floor, wherein the sill assembly is vertically beneath the floor of the cargo bed when the sill assembly is in the stowed position.

11. A vehicle assembly, comprising:
a cab back panel assembly pivotably coupled to a cab of a vehicle;
a sill assembly that includes a portion of a securing system, the sill assembly pivotably coupled to the vehicle, the sill assembly pivotable back and forth between a latching position where the cab back panel assembly can engage the portion of the sill assembly and a stowed position;
a tent configured to be supported by the cab back panel assembly in an open position; and
pockets of the tent, the pockets configured to receive side mirrors of the vehicle when the tent is supported by the cab back panel assembly.

12. A method of securing a cab back panel assembly, comprising:
latching a cab back panel assembly of a vehicle to a portion of a securing system, wherein a sill assembly includes the portion, the cab back panel assembly and the sill assembly each pivotably coupled to the vehicle, wherein the cab back panel assembly includes a first panel and a second panel, the first panel pivotably coupled to a cab of the vehicle and configured to pivot relative to the cab about a first axis, the second panel pivotably coupled to the first panel and configured to pivot relative to the first panel about a second axis that is spaced from the first axis.

13. The method of claim 12, further comprising, prior to the latching, pivoting the sill assembly from a stowed position to a latching position where the cab back panel assembly can engage the portion of the sill assembly.

14. The method of claim 12, wherein the cab back panel assembly separates a passenger compartment of the vehicle from a cargo area of the vehicle when the cab back panel assembly is in a closed position and latched to the portion of the sill assembly, wherein the passenger compartment opens to the cargo area when the cab back panel assembly is in an open position.

15. The method of claim 12, wherein the first panel is vertically above the second panel when the cab back panel assembly is in a closed position.

16. The method of claim 15, wherein the second panel is pivotably coupled to a lower region of the first panel.

\* \* \* \* \*